UNITED STATES PATENT OFFICE.

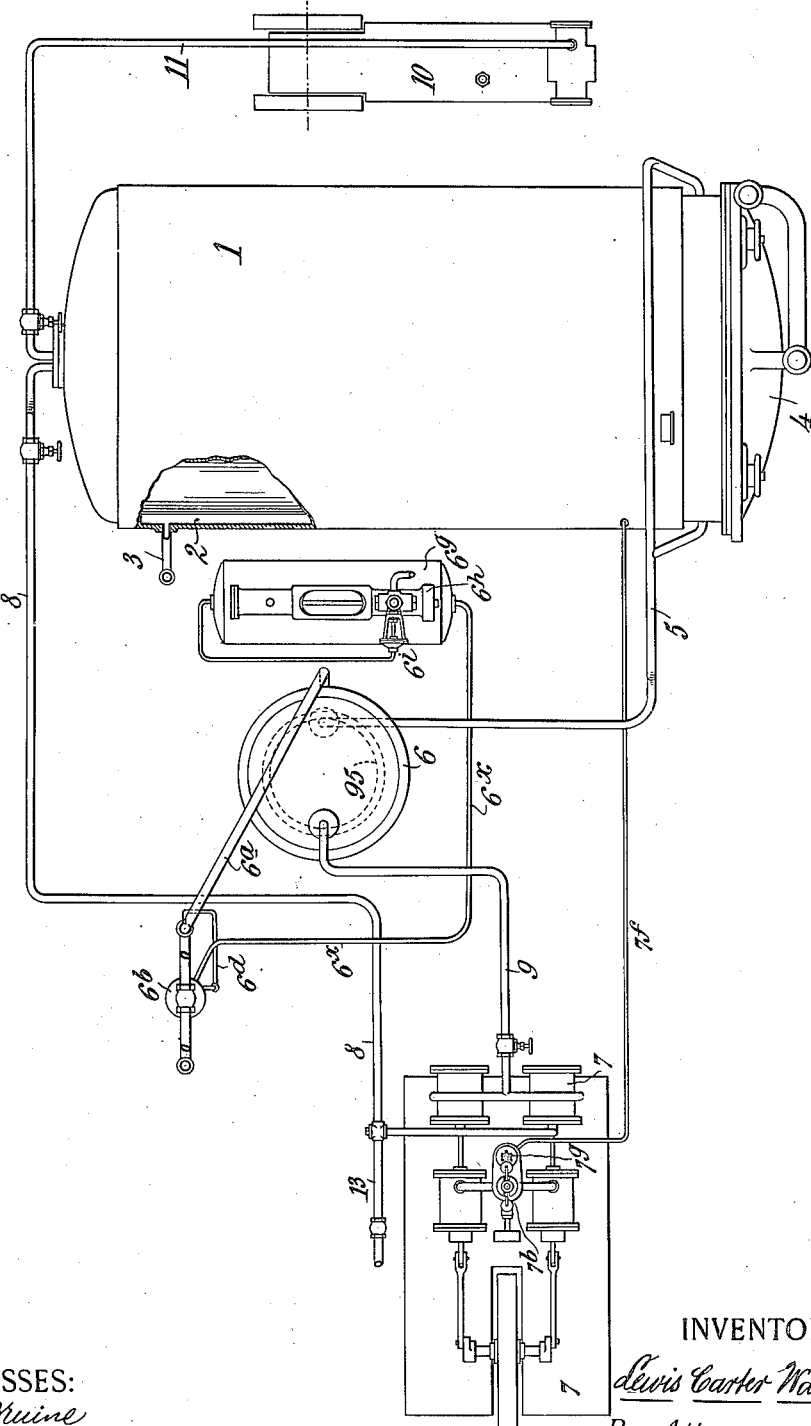

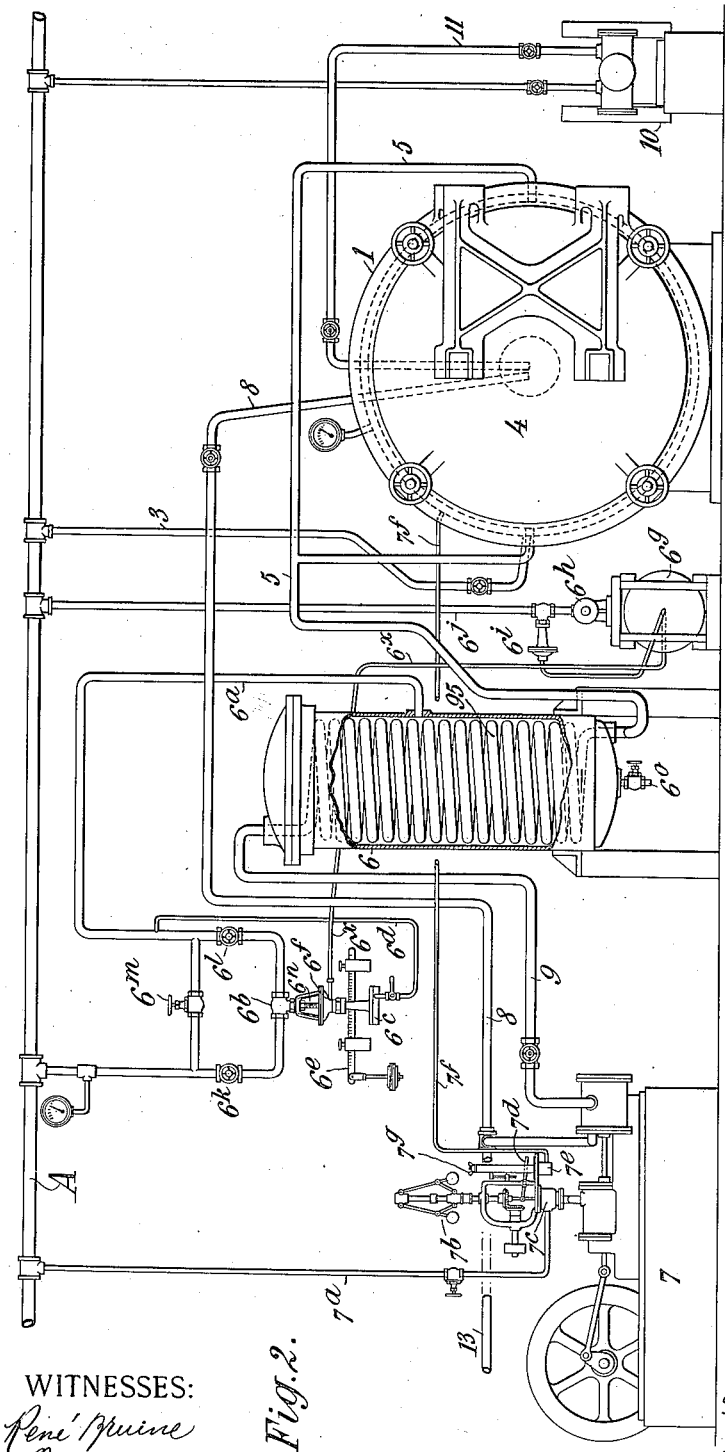

LEWIS CARTER WARNER, OF NAUGATUCK, CONNECTICUT, ASSIGNOR TO THE BEACON FALLS RUBBER SHOE COMPANY, OF BEACON FALLS, CONNECTICUT, A CORPORATION OF CONNECTICUT.

APPARATUS FOR TREATING RUBBER.

1,125,609.  Specification of Letters Patent.  Patented Jan. 19, 1915.

Application filed May 27, 1914. Serial No. 841,213.

*To all whom it may concern:*

Be it known that I, LEWIS CARTER WARNER, a citizen of the United States, residing in Naugatuck, in the county of New Haven and State of Connecticut, have invented certain new and useful Improvements in Apparatus for Treating Rubber, of which the following is a specification.

This invention relates to apparatus for use in the cure or vulcanization of gums, such as india rubber and articles of manufacture composed in whole or in part of compounds of such gums and their ingredients.

Among the objects of the invention is to provide apparatus for use in the production of articles of soft vulcanized rubber whereof the mass of material composing the articles is compact and free from volatile substances and interstitial spaces.

The improved apparatus is peculiarly adapted for use in the manufacture of footwear—boots and shoes,—and is especially useful in carrying out the method set forth in my co-pending application Serial No. 754,925 filed March 17, 1913, for treating rubber.

The drawings accompanying this specification illustrate a practicable embodiment of the invention in a plant for commercial use.

Figure 1 is a plan view of the apparatus; and Fig. 2 is an elevational view thereof.

A vulcanizer 1 is shown, which in the illustration comprises a cylindrical device having a steam jacket 2 supplied by steam from a suitable source through a conduit 3. The vulcanizer is provided with a door 4 at one end through which the articles to be treated will be admitted and discharged. The heated gas, which may be an inert gas such as carbon dioxid, or may be air, is admitted to the vulcanizer at one or more suitable points therein, in the present showing by means of a conduit 5 leading from a pre-heater 6.

Two objects are to be attained in this apparatus, namely, the one that of maintaining the desired pressure within the vulcanizing chamber prior to and during the vulcanization process, and the other that of maintaining the required temperature. In one method of operation the articles are placed in the vulcanizing chamber 1, and after such chamber has been heated to a suitable temperature the air within the chamber is exhausted, whereupon the articles will become compacted and freed from many of the volatile substances in and upon the gums forming the same. After this, gas is forced into the vulcanizing chamber, and pressure, preferably without vulcanizing heat, is applied to the articles by the gas, either an inert gas or air, and afterward and while such pressure is maintained substantially constant, the gas is heated to the vulcanizing temperature, the pressure and heat not being dependent one upon the other and each being controlled independently of the other.

For the purpose of preliminarily reducing the pressure within the vulcanizing chamber 1, a vacuum pump is illustrated at 10 connected by a conduit 11 with the vulcanizing chamber. In the present construction the vacuum pump shown is manually controlled. A pressure pump 7 is shown connected with the vulcanizer by means of a conduit 8 at its receiving side. The discharge from the pump communicates with the pre-heater by means of a conduit 9. The pre-heater is in the form of a steam chamber containing within it a coil 95 connected at its respective ends to the conduits 9 and 5.

The steam for the various portions of the apparatus herein illustrated will be assumed to be received from the steam main A connected to the boiler and containing steam at boiler pressure.

The pump 7 has a connection $7^a$ with the steam main A. On this connection is mounted a governor $7^b$ which controls the valve $7^c$ in a well known manner. A lever $7^d$ is shown pivoted to the governor frame and having a head engaging the stem of the valve $7^c$. The other end of the lever $7^d$ is acted upon by the rod of a diaphragm or piston mounted in the chamber $7^e$ which is open to the pressure in the vulcanizing chamber, a tube $7^f$ being provided for this purpose. The governor herein illustrated is a commercial article and forms in its details no part of the present improvement, its adaptation however, and its presence as an element in the combination, alone being essential. Suitable regulating devices illustrated in a general way at $7^g$ are provided for the pressure controlled portion of the governor, whereby the operation of the pump 7 is automatically controlled by the pressure existing within the vulcanizing chamber. In one method of vulcanizing it has been found that a pressure of 30 pounds placed upon the vulcanizing chamber prior to the attainment of the vulcanizing heat therein, and maintained throughout the process of vulcanization, has given satisfactory results.

It has been found in practising the method above referred to that a temperature of 280 degrees Fahrenheit applied to the vulcanizing chamber after the same has been subjected to a pressure of 30 pounds, is a satisfactory temperature for vulcanizing rubber footwear. It is quite desirable that the temperature be brought up steadily and quickly to the desired vulcanizing temperature and maintained substantially constant thereat. The air or other gas for producing the pressure within the vulcanizing chamber is, as was before stated, forced through the coil 95 of the pre-heater, and from there into the vulcanizing chamber. The shell of the pre-heater 6 is connected by means of a suitable conduit $6^a$ with the steam main A through a valve $6^b$. In the present illustration the temperature of the air or other gas in the vulcanizing chamber is determined and controlled by the pressure of the steam within the preheating chamber. It has been found in practice that 35 pounds pressure within the shell of the preheater will, while the pump 7 is acting, maintain a temperature of about 280 degrees Fahrenheit within the vulcanizing chamber. The steam regulator illustrated for controlling the pressure of the steam within the pre-heater, comprises a diaphragm chamber $6^c$ in connection by means of a tube $6^d$ with the pipe $6^a$ between the preheater and the valve $6^b$. The diaphragm of such chamber acts upon the scale beam $6^e$, which beam is weighted and regulated to suit the requirements of the apparatus. The scale beam acts upon a valve controlling communication between the diaphragm chamber $6^f$, and the pressure tank $6^g$, a tube $6^x$ connecting these. The pressure within the tank is maintained constant by means of a pump $6^h$ and a diaphragm regulator $6^i$ controlling the valve in the supply pipe $6^j$ from the steam main to the pump $6^h$. The regulator herein illustrated is a commercial article and forms in its details no part of the present improvement, its adaptation however, and its presence as an element in the combination, alone being essential. The operation of the regulator, although well known, will for completeness be briefly described. Assuming that the valves $6^k$ and $6^l$ are open and the valve $6^m$ in the by-pass is closed, the valve $6^b$ remains open until the steam within the pre-heating cylinder exceeds that predetermined by the adjustment of the weights upon the scale beam, whereupon the scale beam tips and air is permitted to pass from the pressure reservoir $6^g$ to the diaphragm chamber $6^f$, and the stem $6^n$ which is connected to the valve $6^b$ actuates such valve and closes the same, thereby shutting off the steam from the pre-heater cylinder and permitting the temperature to run down in the pre-heater. This regulation of the temperature of the gas used for the vulcanizing medium it will be seen is absolutely independent of the mechanism employed for maintaining the constancy of the pressure within the vulcanizing chamber. Even the incidental reduction of volume of the gas upon the reduction of the temperature is compensated for by the pump 7 being automatically instantaneously speeded up. The pre-heater cylinder is provided with a discharge cock $6^o$ from which condensation may be voided when necessary. A valve controlled vent from the vulcanizing chamber is provided at 13.

Operation: The apparatus illustrated and above described is capable of operating substantially as follows: The steam jacket 2 of the vulcanizing chamber 1 is connected with the steam main and the walls of such chamber preliminarily heated preparatory to the introduction of the gum formed articles into the vulcanizing chamber. Immediately upon such introduction and the closing of the door 4 the air within the chamber is exhausted by the pump 10 which low pressure assisted by the warmth of the walls of the chamber draws from the mass of gum any imprisoned air and other gases, and many of the volatile constituents of the gum and contents of the mass. All this serves to compact such mass and when the same is on a form to cause close adherence thereto. The vacuum pump is then stopped and the vacuum broken, and communication established with the pre-heater 6, which causes the pump 7 to become active by release of pressure on the governor controlling device $7^e$. The action of the pump continues until the predetermined pressure is reached in the chamber, after which the pump acts either slowly or rapidly or intermittently as conditions demand for maintaining the pressure constant throughout the run. At the time the chamber is placed in connection with the pre-heater the steam employed as the heating agent for the vulcanizing medium is exerting its influence on the same within the coil 95. The pump 7 fills the chamber too rapidly for a rapid rise of temperature therein and its subsequent action serves to gradually raise the temperature to the limit set upon the capacity of the pre-heater by the adjustment of the regulator scale beam $6^e$, upon the temperature reaching such limit it is maintained thereat until the completion of the process, at which time the pre-heater is shut off from the chamber, the chamber opened to atmosphere, the pressure reduced, the door opened and vulcanized articles removed. Thus it will be seen that the pressure is automatically brought to the predetermined point prior to the temperature reaching the vulcanizing degree and maintained thereat during the entire process independently of the temperature, and that the temperature is gradually automatically raised to the predetermined degree and automatically maintained thereat.

It will be understood that the apparatus shown in the drawings is illustrative of the invention and that the scope of the invention is not limited to the details of construction shown in the drawings, the same being of an illustrative example of the invention and one which is and has been in commercial use.

What I claim is:—

1. The combination with a vulcanizing chamber, of means for forcing gas into the chamber, a regulator for automatically controlling the pressure within the chamber, a heater for the gas, and a regulator independent of the pressure regulator for automatically controlling the temperature of the gas within the vulcanizing chamber.

2. The combination with a vulcanizing chamber, of a pressure pump, a conduit extending from the pump to the vulcanizing chamber and embodying a coil, a pre-heater shell surrounding such coil and having a conduit communicating with a source of steam supply, a valve in such source of steam supply, and adjustable means for controlling the valve by the pressure within such pre-heater shell for automatically controlling the temperature of the gas within the vulcanizing chamber, and means for automatically controlling the pump for regulating the pressure within the vulcanizing chamber.

3. The combination with a vulcanizing chamber, of a gas pre-heater communicating therewith and embodying steam heating means for said gas, a pump for forcing gas through such pre-heater and into the vulcanizing chamber, automatic means for controlling the pressure of the steam in said heater to regulate the temperature of the gas, and means for automatically regulating the action of the pump by the pressure of the gas within the vulcanizing chamber.

In witness whereof, I have hereunto signed my name in the presence of two subscribing witnesses.

LEWIS CARTER WARNER.

Witnesses:
J. U. FERRIS,
PAUL K. IMMEL.